US011162464B1

(12) United States Patent
Albladi et al.

(10) Patent No.: US 11,162,464 B1
(45) Date of Patent: Nov. 2, 2021

(54) MANAGING A FUEL FOR A POWER GENERATOR

(71) Applicant: Saudi Arabian Oil Company, Dhahran (SA)

(72) Inventors: Haitham T. Albladi, Riyadh (SA); Ayed A. Ruwaili, Riyadh (SA); Majed A. Zahrani, Riyadh (SA); Abdulaziz H. Saiyari, Riyadh (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/002,350

(22) Filed: Aug. 25, 2020

(51) Int. Cl.
*F02M 37/10* (2006.01)
*F02M 37/50* (2019.01)
*F02M 37/28* (2019.01)
*F02M 37/44* (2019.01)
*F02M 37/02* (2006.01)

(52) U.S. Cl.
CPC ........ *F02M 37/106* (2013.01); *F02M 37/025* (2013.01); *F02M 37/28* (2019.01); *F02M 37/44* (2019.01); *F02M 37/50* (2019.01)

(58) Field of Classification Search
CPC .... F02M 37/106; F02M 37/025; F02M 37/50; F02M 37/28; F02M 37/44
See application file for complete search history.

(56) References Cited

U.S. PATENT DOCUMENTS

| 7,367,223 | B2 | 5/2008 | Kettl et al. | |
|---|---|---|---|---|
| 9,371,774 | B2 * | 6/2016 | Lescure | ................. F02B 63/04 |
| 2016/0273471 | A1 | 9/2016 | Shimpi et al. | |
| 2019/0145922 | A1 | 5/2019 | Ramzan et al. | |
| 2019/0293036 | A1 * | 9/2019 | Marcus | ................ B01D 35/005 |

FOREIGN PATENT DOCUMENTS

WO  WO2014/154664  10/2014

* cited by examiner

*Primary Examiner* — Jacob M Amick
*Assistant Examiner* — Charles J Brauch
(74) *Attorney, Agent, or Firm* — Fish & Richardson P.C.

(57) ABSTRACT

Techniques for managing a fuel for a power generator include storing a volume of a fuel in a primary fuel storage tank that includes an inlet and an outlet; generating electrical power with a solar power assembly; operating a pump assembly with the generated electrical power to circulate a flow of the fuel from the primary fuel storage tank to a fuel filter; removing at least a portion of contaminants from the flow of the fuel; circulating the flow of the fuel to a fuel quality sensor; measuring a quality value of the flow of the fuel; and based on a signal from the fuel quality sensor associated with the quality value of the flow of the fuel, operating a control valve to direct the flow of the fuel from the fuel quality sensor to the primary fuel storage tank from the control valve or an auxiliary fuel storage tank from the control valve.

26 Claims, 3 Drawing Sheets

MANAGING A FUEL FOR A POWER GENERATOR

TECHNICAL FIELD

This disclosure relates to managing a fuel for a power generator and, more particularly, managing a diesel fuel for a backup power generator.

BACKGROUND

Power generators, such as standby diesel power generators, are widely used to provide a reliable backup power source for critical loads and otherwise provide electrical power during the absence of a primary electrical power source, such as power from a power distribution and transmission grid. Often, such backup power generators rarely run absent a failure of the primary power source. A fuel, such as diesel fuel, that provides the combustion fuel for such power generators may play an important role in the dependable operation of such generators. If the power generator is operated with unclean diesel, the generator may function inefficiently or not at all during an outage of the primary power source. Maintaining a good quality of fuel in storage for the power generator may be challenging because of fuel stagnation that occurs due to the infrequent nature of operation of such power generators.

SUMMARY

This disclosure describes implementations of a fuel management system for a power generator, such as a backup diesel power generator. In some aspects, the fuel management system filters a flow of the fuel and determines a quality of the filtered fuel, such as diesel fuel. Based on the determined fuel quality, the fuel management system provides the filtered fuel to a primary storage tank (if the fuel quality is acceptable) or an auxiliary storage tank (if the fuel quality is not acceptable).

In an example implementation, a fuel management system includes a primary fuel storage tank including at least one inlet and at least one outlet and configured to enclose a volume of a fuel for a power generator; at least one pump assembly including a suction that is fluidly coupled to the at least one outlet of the primary fuel storage tank; a solar power assembly electrically coupled to the at least one pump assembly and configured to generate and provide electrical power to the at least one pump assembly from solar energy; a fuel filter including an inlet that is fluidly coupled to a discharge of the at least one pump assembly, the fuel filter configured to remove at least a portion of contaminants from a flow of the fuel circulated from the primary fuel storage tank to the fuel filter by the at least one pump assembly; a fuel quality sensor fluidly coupled to an outlet of the fuel filter and configured to measure a quality value of the flow of the fuel circulated from the fuel filter to the fuel quality sensor; and a control valve including an inlet fluidly coupled to an outlet of the fuel quality sensor, a first outlet fluidly coupled to the primary fuel storage tank, and a second outlet fluidly coupled to an auxiliary fuel storage tank. The control valve is configured to modulate to direct the flow of fuel from the first outlet to the at least one inlet of the primary fuel storage tank or from the second outlet to the auxiliary fuel storage tank based on a signal from the fuel quality sensor associated with the quality value of the flow of the fuel.

An aspect combinable with the example implementation further includes a timer communicably coupled to the at least one pump assembly and configured to activate a motor of the at least one pump assembly based on an expiration of a specified time duration.

In another aspect combinable with any of the previous aspects, the specified time duration is about a month.

In another aspect combinable with any of the previous aspects, the fuel quality sensor is communicably coupled to an actuator of the control valve and configured to provide the signal to the actuator.

In another aspect combinable with any of the previous aspects, the actuator is configured to modulate the control valve to simultaneously open the first outlet and close the second outlet based on the signal from the fuel quality sensor associated with the quality value of the flow of the fuel above a threshold value; and simultaneously open the second outlet and close the first outlet based on the signal from the fuel quality sensor associated with the quality value of the flow of the fuel below the threshold value.

Another aspect combinable with any of the previous aspects further includes an alarm communicably coupled to the fuel quality sensor, the alarm configured to activate based on the fuel quality sensor associated with the quality value of the flow of the fuel below the threshold value.

In another aspect combinable with any of the previous aspects, the alarm is communicably coupled to a monitoring station through a network.

In another aspect combinable with any of the previous aspects, the solar power assembly includes at least one photovoltaic (PV) cell configured to convert the solar energy to the electrical power.

In another aspect combinable with any of the previous aspects, the contaminants include at least one of particulates or water, and the quality value includes a measurement of at least one of an amount of the particulates in the flow of the fuel, or an amount of the water in the flow of the fuel.

In another aspect combinable with any of the previous aspects, the fuel includes diesel fuel.

In another example implementation, a method for managing a fuel for a power generator includes storing a volume of a fuel for a power generator in a primary fuel storage tank that includes at least one inlet and at least one outlet; generating electrical power with a solar power assembly from solar energy; operating at least one pump assembly with the generated electrical power to circulate a flow of the fuel from at least one outlet of the primary fuel storage tank to a fuel filter; removing at least a portion of contaminants from the flow of the fuel circulated from the primary fuel storage tank with the fuel filter; circulating the flow of the fuel to a fuel quality sensor; measuring a quality value of the flow of the fuel with the fuel quality sensor; and based on a signal from the fuel quality sensor associated with the quality value of the flow of the fuel, operating a control valve to direct the flow of the fuel from the fuel quality sensor to the at least one inlet of the primary fuel storage tank from a first outlet of the control valve or an auxiliary fuel storage tank from a second outlet of the control valve.

An aspect combinable with the example implementation further includes determining, with a timer communicably coupled to the at least one pump assembly, an end of a specified time duration; and based on the end of the specified time duration, activating a motor of the at least one pump assembly.

In another aspect combinable with any of the previous aspects, the specified time duration is about a month.

Another aspect combinable with any of the previous aspects further includes providing the signal from the fuel quality sensor to an actuator of the control valve.

Another aspect combinable with any of the previous aspects further includes operating the actuator to modulate the control valve to simultaneously open the first outlet and close the second outlet based on the signal from the fuel quality sensor associated with the quality value of the flow of the fuel above a threshold value; and simultaneously open the second outlet and close the first outlet based on the signal from the fuel quality sensor associated with the quality value of the flow of the fuel below the threshold value.

Another aspect combinable with any of the previous aspects further includes activating an alarm communicably coupled to the fuel quality sensor based on the fuel quality sensor associated with the quality value of the flow of the fuel below the threshold value.

Another aspect combinable with any of the previous aspects further includes transmitting a notification of the alarm activation from the alarm to a monitoring station through a network.

In another aspect combinable with any of the previous aspects, generating electrical power with the solar power assembly from solar energy includes receiving the solar energy on at least one photovoltaic (PV) cell; and converting the received solar energy to the electrical power with the at least one PV cell.

In another aspect combinable with any of the previous aspects, the quality value includes a measurement of at least one of an amount of the contaminants in the flow of the fuel, or an amount of water in the flow of the fuel.

In another aspect combinable with any of the previous aspects, operating at least one pump assembly with the generated electrical power to circulate the flow of the fuel from at least one outlet of the primary fuel storage tank to the fuel filter includes operating the at least one pump assembly with the generated electrical power to circulate a whole volume of the fuel stored in the primary fuel storage tank to the fuel filter.

In another aspect combinable with any of the previous aspects, the fuel includes diesel fuel.

In another example implementation, a system includes a diesel fuel storage tank including at least one inlet and at least two outlets, at least one of the at least two outlets fluidly coupled to a standby power generator; an auxiliary fuel storage tank that includes an inlet; a fuel flow circuit, and a control system communicably coupled to the fuel flow circuit. The fuel flow circuit includes at least one pump assembly including a suction that is fluidly coupled to at least another outlet of the at least two outlets of the diesel fuel storage tank, a fuel filter including an inlet that is fluidly coupled to a discharge of the at least one pump assembly, a fuel quality sensor fluidly coupled to an outlet of the fuel filter, and a control valve that includes an inlet fluidly coupled to an outlet of the fuel quality sensor, a first outlet fluidly coupled to the at least one inlet of the diesel fuel storage tank, and a second outlet fluidly coupled to the inlet of the auxiliary fuel storage tank. The control system is configured to perform operations including controlling the at least one pump assembly to circulate a flow of diesel fuel from the diesel fuel storage tank to the fuel filter to filter the flow of diesel fuel to remove at least a portion of a plurality of contaminants in the diesel fuel, controlling the at least one pump assembly to circulate the filtered flow of diesel fuel from the fuel filter to the fuel quality sensor to measure a quality value of the filtered flow of diesel fuel, comparing the measured quality value to a threshold value; and based on the comparison, controlling the control valve to direct the filtered flow of diesel fuel from the first outlet to the at least one inlet of the diesel fuel storage tank or from the second outlet to the inlet of the auxiliary fuel storage tank.

An aspect combinable with the example implementation further includes a renewable power assembly electrically coupled to the at least one pump assembly.

In another aspect combinable with any of the previous aspects, the control system is configured to perform operations further including controlling the renewable power assembly to generate electrical power from a renewable energy source and provide the generated electrical power to the at least one pump assembly.

In another aspect combinable with any of the previous aspects, the control system is configured to perform operations further including receiving a signal from a timer that indicates an end of a specified time period; and based on receipt of the signal, controlling the at least one pump assembly to circulate the flow of diesel fuel from the diesel fuel storage tank to the fuel filter.

In another aspect combinable with any of the previous aspects, the control system is configured to perform operations further including, based on the measured quality value being above the threshold value, controlling the control valve to direct the filtered flow of diesel fuel from the first outlet to the at least one inlet of the diesel fuel storage tank; and based on the measured quality value being below the threshold value, controlling the control valve to direct the filtered flow of diesel fuel from the second outlet to the inlet of the auxiliary fuel storage tank.

In another aspect combinable with any of the previous aspects, the control system is configured to perform operations further including based on the measured quality value being below the threshold value, activating a fuel quality alarm; and providing an indication of the activated fuel quality alarm to a monitoring system.

Implementations of a fuel management system according to the present disclosure may include one or more of the following features. For example, a fuel management system according to the present disclosure may ensure or help ensure that clean fuel is delivered to a power generator (such as a backup diesel power generator) and prevent or help prevent engine failures caused by poor fuel quality. As another example, a fuel management system according to the present disclosure may improve a quality of stored fuel and extend a lifespan of the stored fuel. As another example, a fuel management system according to the present disclosure may help to extend an operating life of a standby power generator by providing the engine with clean fuel. As another example, a fuel management system according to the present disclosure may reduce a maintenance expenditure that can result from dirty fuel being used in a power generator. As another example, a fuel management system according to the present disclosure may help avoid costs associated with replacing low quality fuel for a power generator. As another example, a fuel management system according to the present disclosure may periodically or continuously monitor a fuel quality of fuel stored for a power generator. As another example, a fuel management system according to the present disclosure may initiate an alarm due to dirty fuel for a power generator and extend the alarm to a 24/7 monitoring system that will communicate such alarm with site supervision to highlight the poor fuel quality.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

Figure 1:
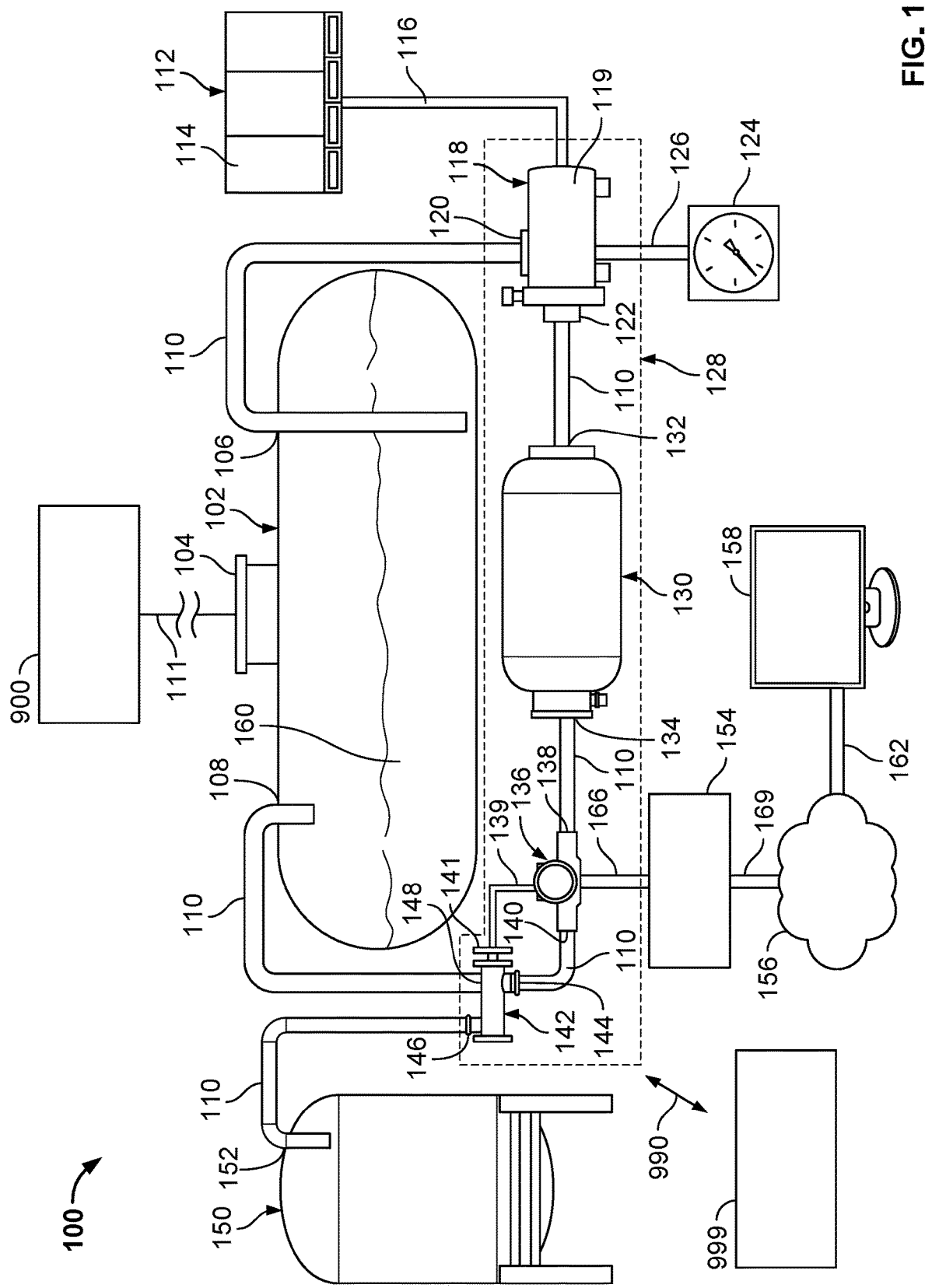
FIG. 1 is a schematic diagram of an example implementation of a fuel management system for a backup power generator according to the present disclosure.

FIG. 1 is a schematic diagram of an example implementation of a fuel management system 100 for a backup power generator 900 according to the present disclosure. Generally, the fuel management system 100 may monitor, filter, supply, and otherwise manage a fuel (for example, a liquid fuel, such as diesel fuel) for the power generator 900. The power generator 900, in some aspects, receives the managed fuel from the fuel management system 100 and uses the fuel to generate electrical power. In some aspects, the power generator 900 generates the electrical power from the fuel provided by the fuel management system 100 when there is a loss of electrical power from a primary electrical power source, such as a power transmission and distribution grid. In some aspects, the power generator 900 is a diesel fuel standby generator that operates only (or usually) where there is a loss of power from a primary power source. As such, the diesel fuel power generator 900 includes a diesel fuel-powered engine that uses diesel fuel to drive an alternator to produce electrical power.

As shown in FIG. 1, this example implementation of the fuel management system 100 includes a primary fuel storage tank 102 that has a volume sized to enclose a fuel 160 (such as diesel fuel) for the power generator 900. In this example, the primary fuel storage tank 102 includes an outlet 104 that is fluidly coupled (for example, by a conduit 111 and other components, such as pumps, valves, and otherwise) to the power generator 900. The primary fuel storage tank 102 also includes an outlet 106 and an inlet 108, each of which is fluidly coupled to the volume of the tank 102. In this example, the outlet 106 receives or is fluidly coupled to a conduit (or pipe) 110 that is coupled to a circulation pump 118.

The circulation pump 118, which may be a centrifugal pump or reciprocating pump, in this example, includes a motor 119 (for example, electric motor) and suction 120 to which the conduit 110 from the outlet 106 is connected. The circulation pump 118 also includes a discharge 122 that is coupled to another conduit 110. The circulation pump 118, in this example, is electrically coupled (through power circuit 116) to a renewable power assembly 112. In this example implementation, the renewable power assembly 112 is or includes a solar power assembly 112 with one or more photovoltaic (PV) cells 114. The PV cell (or cells) 114 operate to generate electrical power for the circulation pump 118 through the conversion of solar energy. Alternatively, the renewable power assembly 112 may utilize other forms of renewable energy, such as wind, water, waves, or hydrogen (or a combination thereof) to generate the electrical power to provide to the circulation pump 118 through power circuit 116. In some aspects, the renewable power assembly 112 may also include one or more storage devices, such as batteries, capacitors, or otherwise, that may also provide electrical power to the circulation pump 118 through power circuit 116 (for example, after being charged by the renewable power assembly 112).

In this example implementation, a timer 124 is communicably coupled to the circulation pump 118 (for example, to the motor 119 or a motor starter of the motor 119) through signal circuit 126 (for example, a wired or wireless communication connection). In some aspects, the timer 124 may be selectively set to keep (and countdown from) a specified time duration. The specified time duration can be in minutes, hours, days, or months. In some aspects, a preferred time duration may be set as about 1 month. Once the specified time duration expires, the signal circuit 126 may be activated to activate the circulation pump 118 (for example, by activating the motor 119 of the pump 118).

As shown in this implementation, the discharge 122 of the circulation pump 118 is coupled through conduit 110 to an inlet 132 of a fuel filter 130. The fuel filter 130, in some aspects, may be designed to remove one or more contaminants from a flow of the fuel 160 during operation of the fuel management system 100. In some aspects, the contaminants include particulate matter (such as dirt, bacteria, sludge, filings, or otherwise) as well as moisture, such as water liquid or vapor. Such contaminants, if left in the fuel 160, may cause the power generator 900 to run inefficiently if at all during operation (such as during a power outage). The fuel filter 130 may include one or more screens, dehydrators, or other components to separate and capture the one or more contaminants from the fuel 160.

An outlet 134 of the fuel filter 130 is coupled through a conduit 110 to an inlet 138 or a fuel quality sensor 136. The fuel quality sensor 136, in some aspects, measures a quality of fuel 160 being circulated from the fuel filter 130. In some aspects, the quality is associated with a number of contaminants entrained in the flow of fuel 160 through the fuel quality sensor 136. For example, the fuel quality sensor 136 may measure an amount of contaminants (for example, particulates, water, water vapor) within a particular volume or volumetric flow rate of the fuel 160 that circulates through the sensor 136. Alternatively, or in addition, the fuel quality sensor 136 may measure a property of the fuel 160 that is associated with a quality of the fuel 160 (in other words, the cleanliness of the fuel 160 or otherwise). For example, the fuel quality sensor 136 may measure a viscosity, kerosene level, biodiesel level, density, dielectric constant, or other property. Although a single fuel quality sensor 136 is shown in FIG. 1, there may be multiple fuel quality sensors 136, with each independent fuel quality sensor 136 measuring a different parameter or property.

An outlet 140 of the fuel quality sensor 136 is coupled through a conduit 110 with an inlet 144 of a control valve 142. As shown in this example implementation, the control valve 142 includes the inlet 144 and two outlets 146 and 148, respectively. The outlet 148 is coupled through conduit 110 to the inlet 108 of the primary fuel storage tank 102. The outlet 146 is coupled through conduit 110 to an inlet 152 of an auxiliary fuel storage tank 150. Thus, in this example, the control valve 142 is a three-way diverting control valve 142, in which the control valve 142 may be controlled (for example, through valve actuator 141) to fluidly couple the inlet 144 to either the outlet 148 or the outlet 146 depending on a command provided to the actuator 141. Thus, in this example, the control valve 142 may not operate to fluidly couple the inlet 144 to both of the outlets 146 and 148 at the same time.

As further shown in FIG. 1, a signal circuit 139 is communicably coupled between the fuel quality sensor 136 and the actuator 141 of the control valve 142. In some aspects, a command or signal from the fuel quality sensor 136, such as a command based at least in part on a measured or determined quality of the fuel 160 circulated through the sensor 136, is sent from the fuel quality sensor 136 to the actuator 141 to control the control valve 142 (for example, to fluidly couple the inlet 144 to the outlet 146 or to the outlet 148).

As shown in FIG. 1 (by the dashed line enclosure), one or more components of the fuel management system 100 comprise a fuel flow circuit 128. For example, in this example, the circulation pump 118, fuel filter 130, fuel quality sensor 136, and control valve 142 (including their respective inlets and outlets and portions of conduit 110) comprise the fuel flow circuit 128. In this example, the fuel flow circuit 128 is fluidly coupled at two locations (inlet 108 and outlet 106) to the primary fuel storage tank 102 and at the inlet 152 of the auxiliary fuel storage tank 150. In alternative implementations, the fuel flow circuit 128 may also include tanks 102 and 150 or other components of fuel management system 100. In other implementations, the fuel flow circuit 128 may not include each of the components of the fuel management system 100 shown in FIG. 1.

As shown in FIG. 1, the fuel quality sensor 136 is also communicably coupled through signal circuit 166 to an alarm 154, which in turn, is communicably coupled to a monitoring station 158 through network 162 (and network connections 164 and 162). In some aspects, a command or signal from the fuel quality sensor 136, such as a command based at least in part on a measured or determined quality of the fuel 160 circulated through the sensor 136, is sent from the fuel quality sensor 136 to the alarm 154 through signal circuit 166. For example, if the measured fuel quality does not meet or exceed a particular threshold that indicates an acceptable quality of the fuel 160 (in other words, to properly operate the power generator 900), a signal may be transmitted from the fuel quality sensor 136 to activate the alarm 154. Subsequently, the activated alarm 154 may transmit a signal through network 156 to the monitoring station 158 to provide an indication (for example, visual, auditory, or both) to an operator.

In some aspects, network 156 may include, for example, a LAN, a WAN, and the computers and networks forming the Internet. The monitoring station 158 may include, for example, a client computing device connected to the network 156 through an interface. In some aspects, the client computing device may include a graphical user interface or an Internet browser, or any combination of them.

The fuel management system 100, in this example, includes a control system 999 that may be communicably coupled with one or more the components of the fuel management system 100 (circulation pump 118, renewable power assembly 112, fuel filter 130, fuel quality sensor 136, control valve 142, timer 124, alarm 154, network 156, and/or monitoring station 158) to provide and receive commands/data 990 (wirelessly or by wired connections). In some examples, the control system 999 may be separate from, but communicably coupled to, the monitoring station 158 (for example, through network 156 or otherwise). In alternative aspects, the control system 999 may be part of or integrated with the monitoring station 158.

The control system 999 can include a computer-readable medium storing instructions (such as flow control instructions and other instructions) executable by one or more processors to perform operations (such as flow control operations). For example, data 990, in the form of sensed values of fuel quality, pressure, temperature, current, voltage, solar intensity, fuel density, fuel viscosity, contaminant concentration, and other data) may be received by the control system 999 and processed to generate one or more commands 990 back to the components of the fuel management system 100 to operate or control such components. In some aspects, one or more operations performed by the components of the fuel management system 100 may be based on commands 990 received from the control system 999.

The example implementation described includes process streams (for example, process liquid, gasses, or mixed-phase fluids) in the form of, for example, the flow of fuel 160, within the fuel management system 100. The process streams can be circulated using one or more flow control systems implemented throughout the fuel management system 100. A flow control system can include one or more flow pumps (such as pump 118 and/or other pumps) to circulate the fuel 160 through the fuel flow circuit 128, one or more flow conduits through which the process streams are flowed, and one or more valves (such as control valve 142 and/or other valves) to regulate the flow of fuel 160 through the conduits 110. A flow control system can also include one or more electrical circuits to transfer electrical power (for example, current at a particular voltage) between the renewable power assembly 112 and other components of the fuel management system 100.

In some implementations, a flow control system can be operated manually. For example, an operator can set a flow rate for each pump and set valve open or close positions to regulate the flow of the process streams through the conduits in the flow control system. Once the operator has set the flow rates and the valve open or close positions for all flow control systems distributed across the system for managing a flow of the fuel 160, the flow control system can flow the streams under constant flow conditions, for example, constant volumetric rate or other flow conditions. To change the flow conditions, the operator can manually operate the flow control system, for example, by changing the pump flow rate or the valve open or close position.

In some implementations, a flow control system can be operated automatically, such as by the control system 999 through control signals 990. For example, the flow control system can be connected to a computer or control system (control system 999) to operate the flow control system. An operator can set the flow rates and the valve open or close positions for all flow control systems distributed across the facility using the control system. In such implementations, the operator can manually change the flow conditions by providing inputs through the control system. Also, in such implementations, the control system can automatically (that is, without manual intervention) control one or more of the flow control systems, for example, using feedback systems connected to the control system. For example, a sensor (such as fuel quality sensor 136 or other sensor) can be connected to a conduit through which a process stream flows. The sensor can monitor and provide a flow condition (such as a fuel quality, pressure, temperature, time of day, or other flow condition) of the process stream to the control system. In response to the flow condition exceeding a threshold (such as a threshold fuel quality value), the control system 999 can automatically perform operations.

Figure 2:
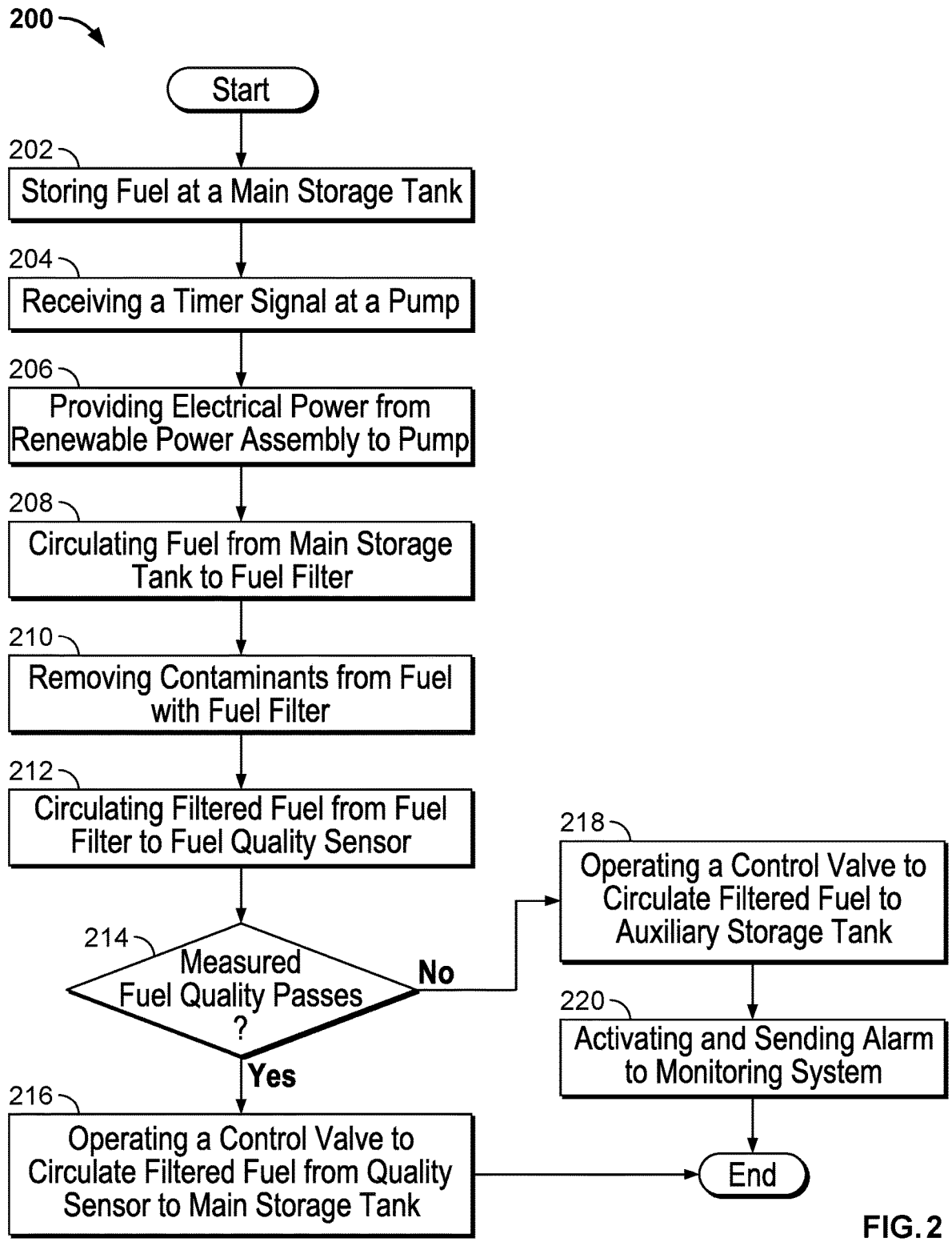
FIG. 2 illustrates a flowchart of an example method of operation of a fuel management system for a backup power generator according to the present disclosure.

FIG. 2 illustrates a flowchart of an example method of operation of the fuel management system 100 for a backup power generator 900 according to the present disclosure. In some aspects, all or part of the example method 200 may be performed with the control system 999. In some aspects, all or part of the example method 200 may be performed independent of the control system 999. Method 200 may begin at step 202, which includes storing fuel at a main storage tank. For example, as shown in FIG. 1, the fuel 160, which in some aspects may be a diesel fuel 160, is stored in primary (or main) storage tank 102. The primary fuel storage tank 102 is fluidly coupled to provide fuel 160 to the power generator 900 (for example, a standby diesel power generator) when needed.

Method 200 may continue at step 204, which includes receiving a timer signal at a pump. For example, in an example aspect, the timer 124 is communicably coupled to the motor 119 (or motor starter, such as a full voltage contact or variable frequency drive). The timer 124 may be set for a particular time duration, such as, for instance, 1 month. At the expiration of the specified time duration, the timer 124 sends a signal through signal circuit 126 to the motor 119 (or motor starter) to activate the pump 118.

In another example aspect, the timer 124 is communicably coupled to the motor 119 through the control system 999. In this example, at the expiration of the specified time duration, the timer 124 sends a signal through the signal 990 to the control system 999 to indicate the expiration of the time period. In turn, the control system 999 sends a command 990 to the pump motor 119 (or motor starter) to activate the pump 118.

Method 200 may continue at step 206, which includes providing electrical power from a renewable power assembly to the pump. For example, in the example implementation, the motor 119 of the pump 118 is electrically coupled to renewable power assembly 112. Upon activation of the pump 118, the motor 119 may draw electrical power through electrical circuit 116 from the renewable power assembly 112. In some aspects, as described, the renewable power assembly 112 comprises a solar power assembly 112 that utilizes one or more PV cells to generate the electrical power for the pump 118.

Method 200 may continue at step 208, which includes circulating fuel from the main storage tank to a fuel filter. For example, once activated, the circulation pump 118 circulates the fuel 160 from the primary fuel storage tank 102 to the suction 120 of the pump, through the discharge 122 of the pump 118, and to the inlet 132 of the fuel filter 130 (through conduits 110). In some aspects, circulation of the fuel 160 through, for example, the fuel flow circuit 128, may continue until an entire volume of the fuel 160 is circulated from the primary fuel storage tank 102 (and through the fuel flow circuit 128).

Method 200 may continue at step 210, which includes removing contaminants from the fuel with the fuel filter. For example, as the fuel 160 is circulated through the fuel filter 130 (or multiple fuel filters arranged in series or parallel in other aspects), contaminants, such as particulates and moisture, may be removed from the fuel 160. Contaminants include matter that may make the fuel 160 unfit to power the power generator 900 (without damaging the generator 900 or causing inefficient operation of the generator 900).

Method 200 may continue at step 212, which includes circulating filtered fuel from the fuel filter to a fuel quality sensor. For example, a flow of the fuel 160 filtered by the fuel filter 130 circulates through the fuel quality sensor 136, where a fuel quality is measured. In some aspects, a fuel quality may be a quantitative measurement of, for instance, a cleanliness of the fuel 160. In some aspects, the fuel quality is a measurement (by the fuel quality sensor 136) of an absolute number of contaminants in the flow of fuel 160. In some aspects, the fuel quality is a measurement (by the fuel quality sensor 136) of a percentage of contaminants relative to volume or volumetric flow rate of the flow of fuel 160.

Method 200 may continue at step 214, which includes a determination of whether a measured fuel quality passes or meets or exceeds a specified fuel quality threshold. The threshold may be pre-specified, for example, at the fuel quality sensor 136 or at the control system 999 (or even at the monitoring station 158). In some aspects, if the measured fuel quality indicates that any contaminants in the fuel 160 are less than a particular amount (absolute or relative), then the fuel quality may exceed the fuel quality threshold. If the measured fuel quality indicates that any contaminants in the fuel 160 are more than a particular amount (absolute or relative), then the fuel quality may not exceed the fuel quality threshold.

If the determination in step 214 is yes (in other words, the fuel quality passes and a fuel quality value is met or exceeded), then method 200 may continue at step 216, which includes operating a valve to circulate the filtered fuel from the fuel quality sensor to the main storage tank. For example, in some aspects, if the fuel quality sensor 136 indicates or makes a determination that the fuel quality value exceeds the specified threshold, then the fuel quality sensor 136 provides a signal to the control valve 142 (or the actuator 141 of the valve 142) through signal circuit 139 to operate the control valve 142. The signal provided through signal circuit 139 controls the control valve 142 to divert the flow of the filtered fuel 160 from the fuel quality sensor 136, through the inlet 144 of the valve 142, and to the outlet 148 back to the primary fuel storage tank 102.

In another example aspect, if the fuel quality sensor 136 indicates or makes a determination that the fuel quality value exceeds the specified threshold, then the fuel quality sensor 136 provides a signal 990 to the control system 999, which in turn provides a command 990 to the control valve 142 (or the actuator 141 of the valve 142) to operate the control valve 142. The signal provided through signal circuit 139 controls the control valve 142 to divert the flow of the filtered fuel 160 from the fuel quality sensor 136, through the inlet 144 of the valve 142, and to the outlet 148 back to the primary fuel storage tank 102. After the completion of step 216, method 200 may end (or return to a previous step).

If the determination in step 214 is no (in other words, the fuel quality fails and a fuel quality value is not met), then method 200 may continue at step 218, which includes operating a control valve to circulate filtered fuel to an auxiliary storage tank. For example, in some aspects, if the fuel quality sensor 136 indicates or makes a determination that the fuel quality value does not meet the specified threshold, then the fuel quality sensor 136 provides a signal to the control valve 142 (or the actuator 141 of the valve 142) through signal circuit 139 to operate the control valve 142. The signal provided through signal circuit 139 controls the control valve 142 to divert the flow of the filtered fuel 160 from the fuel quality sensor 136, through the inlet 144 of the valve 142, to the outlet 146, and to the auxiliary fuel storage tank 150 (for example, for later disposal or further cleaning).

In another example aspect, if the fuel quality sensor 136 indicates or makes a determination that the fuel quality value does not meet the specified threshold, then the fuel quality sensor 136 provides a signal 990 to the control system 999, which in turn provides a command 990 to the control valve 142 (or the actuator 141 of the valve 142) to operate the control valve 142. The signal provided through signal circuit 139 controls the control valve 142 to divert the flow of the filtered fuel 160 from the fuel quality sensor 136, through the inlet 144 of the valve 142, to the outlet 146, and to the auxiliary fuel storage tank 150 (for example, for later disposal or further cleaning).

Method 200 may continue at step 220, which includes activating and sending an alarm to a monitoring system. For example, in some aspects, since the fuel quality sensor 136 indicates or determines that the fuel quality value does not meet the specified threshold, a signal from the fuel quality sensor 136 is provided through signal circuit 166 to the alarm 154 in order to activate the alarm 154 (for example, visually, audibly, or both). In turn, the alarm 154 provides an indication of the activation of the alarm 154 through network 156 and to the monitoring station 158 to notify, for example, an operator at the monitoring station 158.

In another example aspect, if the fuel quality sensor 136 indicates or makes a determination that the fuel quality value does not meet the specified threshold, then the fuel quality sensor 136 provides a signal 990 to the control system 999, which in turn provides a command 990 to the alarm 154 to activate. The control system 999, in some aspects, may also provide a signal 990 to the monitoring station 158 (through network 156 or otherwise) to indicate the activation of the alarm 154. After the completion of step 220, method 200 may end (or return to a previous step).

Figure 3:
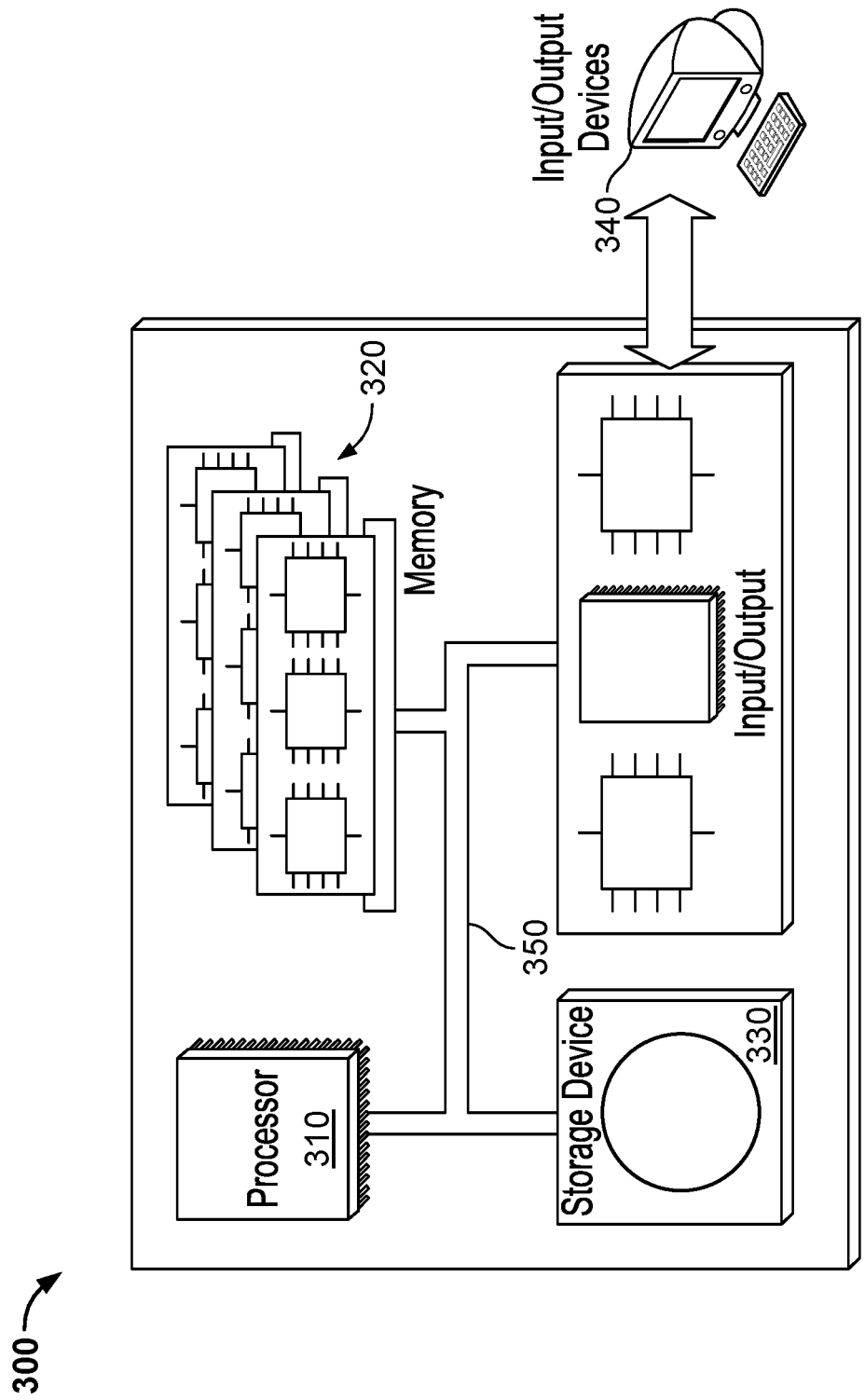
FIG. 3 is a schematic illustration of an example controller (or control system) for controlling operations of a fuel management system for a backup power generator according to the present disclosure.

FIG. 3 is a schematic illustration of an example controller 300 (or control system) for controlling operations of a fuel management system for a backup power generator according to the present disclosure. For example, the controller 300 may include or be part of the control system 999 shown in FIG. 1, all or part of the monitoring station 158, or both. The controller 300 is intended to include various forms of digital computers, such as printed circuit boards (PCB), processors, digital circuitry, or otherwise parts of a power system. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 300 includes a processor 310, a memory 320, a storage device 330, and an input/output device 340 (for displays, input devices, example, sensors, valves, pumps). Each of the components 310, 320, 330, and 340 are interconnected using a system bus 350. The processor 310 is capable of processing instructions for execution within the controller 300. The processor may be designed using any of a number of architectures. For example, the processor 310 may be a CISC (Complex Instruction Set Computers) processor, a RISC (Reduced Instruction Set Computer) processor, or a MISC (Minimal Instruction Set Computer) processor.

In one implementation, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340.

The memory 320 stores information within the controller 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the controller 300. In one implementation, the storage device 330 is a computer-readable medium. In various different implementations, the storage device 330 may be a floppy disk device, a hard disk device, an optical disk device, or a tape device.

The input/output device 340 provides input/output operations for the controller 300. In one implementation, the input/output device 340 includes a keyboard and/or pointing device. In another implementation, the input/output device 340 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A fuel management system, comprising:
   a primary fuel storage tank comprising at least one inlet and at least one outlet, the primary fuel storage tank configured to enclose a volume of a fuel for a power generator;
   at least one pump assembly comprising a suction that is fluidly coupled to the at least one outlet of the primary fuel storage tank;
   a solar power assembly electrically coupled to the at least one pump assembly and configured to generate and provide electrical power to the at least one pump assembly from solar energy;
   a fuel filter comprising an inlet that is fluidly coupled to a discharge of the at least one pump assembly, the fuel filter configured to remove at least a portion of contaminants from a flow of the fuel circulated from the primary fuel storage tank to the fuel filter by the at least one pump assembly;
   a fuel quality sensor fluidly coupled to an outlet of the fuel filter and configured to measure a quality value of the flow of the fuel circulated from the fuel filter to the fuel quality sensor; and
   a control valve comprising an inlet fluidly coupled to an outlet of the fuel quality sensor, a first outlet fluidly coupled to the primary fuel storage tank, and a second outlet fluidly coupled to an auxiliary fuel storage tank, the control valve configured to modulate to direct the flow of fuel from the first outlet to the at least one inlet of the primary fuel storage tank or from the second outlet to the auxiliary fuel storage tank based on a signal from the fuel quality sensor associated with the quality value of the flow of the fuel.

2. The fuel management system of claim 1, further comprising a timer communicably coupled to the at least one pump assembly and configured to activate a motor of the at least one pump assembly based on an expiration of a specified time duration.

3. The fuel management system of claim 2, wherein the specified time duration is about a month.

4. The fuel management system of claim 1, wherein the fuel quality sensor is communicably coupled to an actuator of the control valve and configured to provide the signal to the actuator.

5. The fuel management system of claim 4, wherein the actuator is configured to modulate the control valve to:
   simultaneously open the first outlet and close the second outlet based on the signal from the fuel quality sensor associated with the quality value of the flow of the fuel above a threshold value; and
   simultaneously open the second outlet and close the first outlet based on the signal from the fuel quality sensor associated with the quality value of the flow of the fuel below the threshold value.

6. The fuel management system of claim 5, further comprising an alarm communicably coupled to the fuel quality sensor, the alarm configured to activate based on the fuel quality sensor associated with the quality value of the flow of the fuel below the threshold value.

7. The fuel management system of claim 6, wherein the alarm is communicably coupled to a monitoring station through a network.

8. The fuel management system of claim 1, wherein the solar power assembly comprises at least one photovoltaic (PV) cell configured to convert the solar energy to the electrical power.

9. The fuel management system of claim 1, wherein the contaminants comprise at least one of particulates or water, and the quality value comprises a measurement of at least one of an amount of the particulates in the flow of the fuel, or an amount of the water in the flow of the fuel.

10. The fuel management system of claim 1, wherein the fuel comprises diesel fuel.

11. A method for managing a fuel for a power generator, comprising:
   storing a volume of a fuel for a power generator in a primary fuel storage tank that comprises at least one inlet and at least one outlet;

generating electrical power with a solar power assembly from solar energy;
operating at least one pump assembly with the generated electrical power to circulate a flow of the fuel from at least one outlet of the primary fuel storage tank to a fuel filter;
removing at least a portion of contaminants from the flow of the fuel circulated from the primary fuel storage tank with the fuel filter;
circulating the flow of the fuel to a fuel quality sensor;
measuring a quality value of the flow of the fuel with the fuel quality sensor; and
based on a signal from the fuel quality sensor associated with the quality value of the flow of the fuel, operating a control valve to direct the flow of the fuel from the fuel quality sensor to the at least one inlet of the primary fuel storage tank from a first outlet of the control valve or an auxiliary fuel storage tank from a second outlet of the control valve.

12. The method of claim 11, further comprising:
determining, with a timer communicably coupled to the at least one pump assembly, an end of a specified time duration; and
based on the end of the specified time duration, activating a motor of the at least one pump assembly.

13. The method of claim 12, wherein the specified time duration is about a month.

14. The method of claim 11, further comprising providing the signal from the fuel quality sensor to an actuator of the control valve.

15. The method of claim 14, further comprising operating the actuator to modulate the control valve to:
simultaneously open the first outlet and close the second outlet based on the signal from the fuel quality sensor associated with the quality value of the flow of the fuel above a threshold value; and
simultaneously open the second outlet and close the first outlet based on the signal from the fuel quality sensor associated with the quality value of the flow of the fuel below the threshold value.

16. The method of claim 15, further comprising activating an alarm communicably coupled to the fuel quality sensor based on the fuel quality sensor associated with the quality value of the flow of the fuel below the threshold value.

17. The method of claim 16, further comprising transmitting a notification of the alarm activation from the alarm to a monitoring station through a network.

18. The method of claim 11, wherein generating electrical power with the solar power assembly from solar energy comprises:
receiving the solar energy on at least one photovoltaic (PV) cell; and
converting the received solar energy to the electrical power with the at least one PV cell.

19. The method of claim 11, wherein the quality value comprises a measurement of at least one of an amount of the contaminants in the flow of the fuel, or an amount of water in the flow of the fuel.

20. The method of claim 11, wherein operating at least one pump assembly with the generated electrical power to circulate the flow of the fuel from at least one outlet of the primary fuel storage tank to the fuel filter comprises operating the at least one pump assembly with the generated electrical power to circulate a whole volume of the fuel stored in the primary fuel storage tank to the fuel filter.

21. The method of claim 11, wherein the fuel comprises diesel fuel.

22. A system, comprising:
a diesel fuel storage tank comprising at least one inlet and at least two outlets, at least one of the at least two outlets fluidly coupled to a standby power generator;
an auxiliary fuel storage tank that comprises an inlet;
a fuel flow circuit that comprises:
at least one pump assembly comprising a suction that is fluidly coupled to at least another outlet of the at least two outlets of the diesel fuel storage tank,
a fuel filter comprising an inlet that is fluidly coupled to a discharge of the at least one pump assembly,
a fuel quality sensor fluidly coupled to an outlet of the fuel filter, and
a control valve comprising an inlet fluidly coupled to an outlet of the fuel quality sensor, a first outlet fluidly coupled to the at least one inlet of the diesel fuel storage tank, and a second outlet fluidly coupled to the inlet of the auxiliary fuel storage tank; and
a control system communicably coupled to the fuel flow circuit and configured to perform operations comprising;
controlling the at least one pump assembly to circulate a flow of diesel fuel from the diesel fuel storage tank to the fuel filter to filter the flow of diesel fuel to remove at least a portion of a plurality of contaminants in the diesel fuel,
controlling the at least one pump assembly to circulate the filtered flow of diesel fuel from the fuel filter to the fuel quality sensor to measure a quality value of the filtered flow of diesel fuel,
comparing the measured quality value to a threshold value; and
based on the comparison, controlling the control valve to direct the filtered flow of diesel fuel from the first outlet to the at least one inlet of the diesel fuel storage tank or from the second outlet to the inlet of the auxiliary fuel storage tank.

23. The system of claim 22, further comprising a renewable power assembly electrically coupled to the at least one pump assembly, the control system configured to perform operations further comprising controlling the renewable power assembly to generate electrical power from a renewable energy source and provide the generated electrical power to the at least one pump assembly.

24. The system of claim 22, wherein the control system is configured to perform operations further comprising:
receiving a signal from a timer that indicates an end of a specified time period; and
based on receipt of the signal, controlling the at least one pump assembly to circulate the flow of diesel fuel from the diesel fuel storage tank to the fuel filter.

25. The system of claim 22, wherein the control system is configured to perform operations further comprising:
based on the measured quality value being above the threshold value, controlling the control valve to direct the filtered flow of diesel fuel from the first outlet to the at least one inlet of the diesel fuel storage tank; and
based on the measured quality value being below the threshold value, controlling the control valve to direct the filtered flow of diesel fuel from the second outlet to the inlet of the auxiliary fuel storage tank.

26. The system of claim 25, wherein the control system is configured to perform operations further comprising:
based on the measured quality value being below the threshold value, activating a fuel quality alarm; and providing an indication of the activated fuel quality alarm to a monitoring system.

\* \* \* \* \*